June 26, 1928.
W. A. MITCHELL
RADIUS FINDER
Filed Oct. 27, 1921
1,674,834
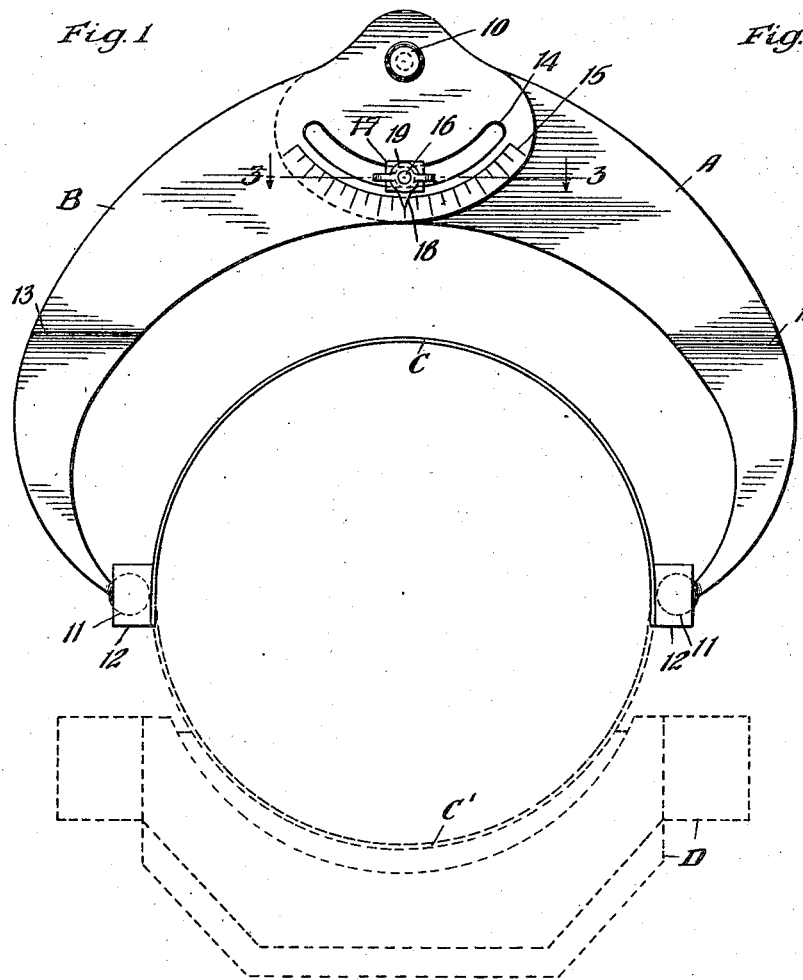
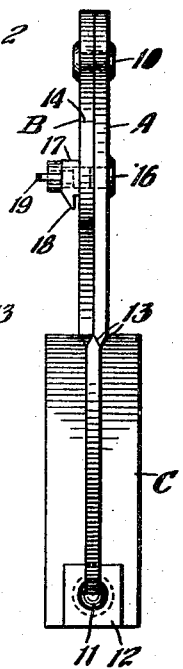
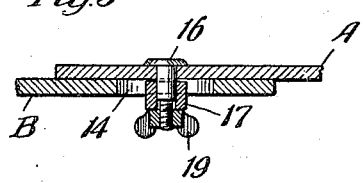
Witnesses
Wm. Geiger
Inventor
William A. Mitchell
By Geo. I. Haight
His Atty.

Patented June 26, 1928.

1,674,834

UNITED STATES PATENT OFFICE.

WILLIAM A. MITCHELL, OF DENISON, TEXAS.

RADIUS FINDER.

Application filed October 27, 1921. Serial No. 510,921.

This invention relates to improvements in radius finders.

One of the greatest difficulties encountered in the operation of railway rolling stock is hot journals or hot boxes. Not only do hot journals or hot-boxes necessitate replacement of the bearings, but cause far greater loss to the railroads because of the delays to the movements of the trains while awaiting the cooling of the journal. The greatest cause of hot journals or hot-boxes is because of improper fitting of the journals and the journal bearings, there having been no practical means heretofore of quickly and accurately determining the proper size bearing for a particular journal.

The object of my invention is to provide a very simple and inexpensive device capable of being used by any average trainman or repair-man by means of which the radius or circumference of any particular journal can be readily obtained and a corresponding determination made of a journal bearing to insure the proper size bearing being applied to the particular journal.

In the drawing forming a part of this specification, Fig. 1 is an elevational view of my improved device showing it as applied to a journal or axle, that is, to determine the radius or circumference of a cylindrical member. The dotted line position of the band employed in my device, as shown in Fig. 1, indicates the application of my device to determine the proper size bearing for the journal as gauged by my device. Fig. 2 is an edge elevation of the construction illustrated in Fig. 1. And Fig. 3 is a detail sectional view corresponding substantially to the section line 3—3 of Fig. 1.

In carrying out my invention, I employ two arms or plates A and B of arcuate form, the same being pivotally connected at their larger ends as by the rivet pin 10, in the manner of the pair of calipers. Preferably the pivotal connection will be so made as to produce considerable friction between the two plates A and B so as to prevent their accidental movement toward or from each other under ordinary conditions.

The free ends of the plates A and B are formed with a ball joint as indicated at 11 with which cooperate corresponding blocks 12 having ball sockets, thereby adapting the blocks 12 to have a universal movement with respect to the free ends of the tips of the plates A and B. In order that the pivotal connections of the blocks 12 with the plates A and B may be brought in the same plane, the plates A and B are oppositely laterally offset, as indicated at 13 in Fig. 2, intermediate their ends.

Secured at its ends to the blocks 12 is a thin flexible strip or band C of suitable length, preferably steel. The flexible band C is of such stiffness as to assume a circular contour and to retain that contour unless excessive force is brought to bear thereon to distort the same.

One of the plates, as for instance the plate B, may be provided with a slot 14 concentric with the pivot 10 and a corresponding scale 15 adjacent the slot 14. The other plate A carries a stud 16 on which is mounted a small block 17 having a pointer 18 projecting over the scale 15. The pointer block 17 is held in place by means of a wing nut 19 and the parts may be clamped in any desired adjusted position by tightening down the wing nut, as will be obvious.

The improved device is employed as follows.

The user first applies the band over a journal, the device being pushed down until the band snugly fits the journal. The pointer 18 will indicate the size or diameter of the journal and the two plates A and B may be rigidly clamped together if desired. To then ascertain if the bearing to be used with the journal is of the correct radius, the band C is then swung through an arc of 180° with respect to the pivots provided by the ball and the socket joints until the band is in the inverted position, as shown by the dotted lines C' in Fig. 1. In this position, the band is then inserted within a journal bearing, one standard form of which for railroad use, is indicated by the dotted lines at D in Fig. 1. If the bearing D is of the proper size for the particular journal which has been measured, it is evident that the band will fit snugly within the bearing and thus present visual evidence thereof to the user. If the bearing D is not of the proper size, this fact will appear by reason of failure of the band C to either fit the curvature of the bearing or by buckling intermediate its ends.

From the preceding description, it will be seen that my improved device is adapted for determining inside and outside radii or circumferences and provides very simple and effective means for insuring the use of proper size bearings with journals.

I have herein shown and described what I now consider the preferred manner of carrying out the invention, but the same is merely illustrative and I contemplate all changes and modifications that come within the scope of the claims appended hereto.

I claim:

1. In a device of the character described, the combination with a pair of arms pivotally connected at one end; of a flexible band; and means for pivotally attaching the ends of said band to the free ends of said arms to adapt said band to swing about an axis coinciding with a line extending between the free ends of said arms, said means comprising ball and socket joints.

2. In a device of the character described, the combination with two plates pivotally connected at one end, said plates being of generally arcuate formation and provided with ball sections at the free ends thereof; of a flexible band; and a pair of blocks to which the ends of said band are secured, said blocks having sockets within which are received said ball sections of the arms thereby adapting said blocks for universal adjustment with respect to the free ends of said arms.

3. In a device for gauging the convex surfaces of axles and the concave surfaces of bearings therefor, the combination with a pair of arms pivotally connected at one end, of a flexible member adapted to conform to said convex and concave surfaces, and means for movably attaching said member at its ends to the respective free ends of said arms.

4. In a device for gauging the bearing surfaces of axles and journal bearings, the combination with a pair of arms pivotally connected at one end; of a flexible member adapted to conform to convex and concave surfaces, means for movably attaching the ends of said member to the respective free ends of said arms for bodily adjustment to different positions relative to said arms; and cooperable means on said two arms adjacent the pivotal connection thereof to indicate the relative angular relation of said arms.

5. In a device for gauging the bearing surfaces of axles and journal bearings therefor, the combination with a pair of arms pivotally connected at one end; of a flexible band the opposite sides of which are adapted to conform to convex and concave surfaces respectively; and means for pivotally attaching the ends of said band to the free ends of said arms to adapt the said band to swing about an axis coinciding with a line extending between the free ends of said arms.

6. In a device for measuring axles and bearings therefor, the combination with a pair of arms pivotally connected at one end; of a curvable, flexible member; means at the ends of said member connecting the same to the respective free ends of said arms, said member being adapted for engagement with concave and convex surfaces, the overall length of said flexible member from end to end being less than the distance between the free ends of said arms, measured along the inner edges thereof.

7. In a device of the character described, for measuring axles and the co-operating bearings therefor, the combination with conformable means engageable over an axle and within the bearing co-operating therewith, said conformable means having opposed surfaces; means permitting adjustment of said conformable means to conform one of said surfaces to the convex surface of an axle and thereby simultaneously conform the other of said surfaces to the concave surface of a bearing of the proper size to co-operate with said axle.

8. In a device of the character described, for measuring axles and the co-operating bearings therefor, the combination with a holder; of a flexible member having two gaging surfaces on opposite sides thereof, one of said surfaces conforming to the convex surface of an axle and the other surface conforming to the concave surface of the co-operating bearing for said axle; and means for adjustably mounting said member on said holder for movement to different positions with reference to said holder to engage respectively over said axle and within the bearing therefor.

In witness that I claim the foregoing I have hereunto subscribed my name Oct. 21, 1921.

WILLIAM A. MITCHELL.